(12) United States Patent
Ota

(10) Patent No.: US 6,437,797 B1
(45) Date of Patent: Aug. 20, 2002

(54) IMAGE REPRODUCING METHOD AND IMAGE DATA MANAGING METHOD

(75) Inventor: Yoshinori Ota, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/025,422

(22) Filed: Feb. 18, 1998

(30) Foreign Application Priority Data

Feb. 18, 1997 (JP) .............................................. 9-034164

(51) Int. Cl.[7] ................................................ G09G 5/00
(52) U.S. Cl. ...................... 345/638; 345/619; 345/838
(58) Field of Search ................................ 345/133, 134, 345/129, 131, 132, 127, 619, 632, 634, 638, 799, 800, 838

(56) References Cited

U.S. PATENT DOCUMENTS

| | | | | |
|---|---|---|---|---|
| 4,737,927 A | * | 4/1988 | Hanabusa et al. ........... 364/443 |
| 5,283,562 A | * | 2/1994 | Kaneko et al. ............. 345/131 |
| 5,500,743 A | * | 3/1996 | Sakaegi et al. ............. 358/403 |
| 5,550,584 A | * | 8/1996 | Yamada ...................... 348/153 |
| 5,638,184 A | * | 6/1997 | Fujimoto et al. ............ 386/112 |
| 5,682,441 A | * | 10/1997 | Ligtenberg et al. ......... 382/232 |
| 5,748,109 A | * | 5/1998 | Kosaka et al. .............. 340/995 |
| 5,784,059 A | * | 7/1998 | Morimoto et al. .......... 345/353 |
| 5,835,266 A | * | 11/1998 | Kitajima ..................... 359/348 |

* cited by examiner

Primary Examiner—Richard Hjerpe
Assistant Examiner—Kimnhung Nguyen

(57) ABSTRACT

The image reproducing method of the present invention includes the steps of: reading captured images and GPS information relating to each captured image, recorded by a camera connected to a GPS unit; reading desired map data from a recording medium which contains map data; displaying, on a monitor, a digital map including the capturing places of the read captured images; and displaying a thumbnail of each read captured image at an appropriate position on the digital map. Thus, it is possible to easily see the capturing place of each captured image and produce the albums in accordance with the capturing places with reference to the displayed image. Markers indicating the capturing places and lines drawn between the markers may be displayed to show the image-capturing route.

18 Claims, 15 Drawing Sheets

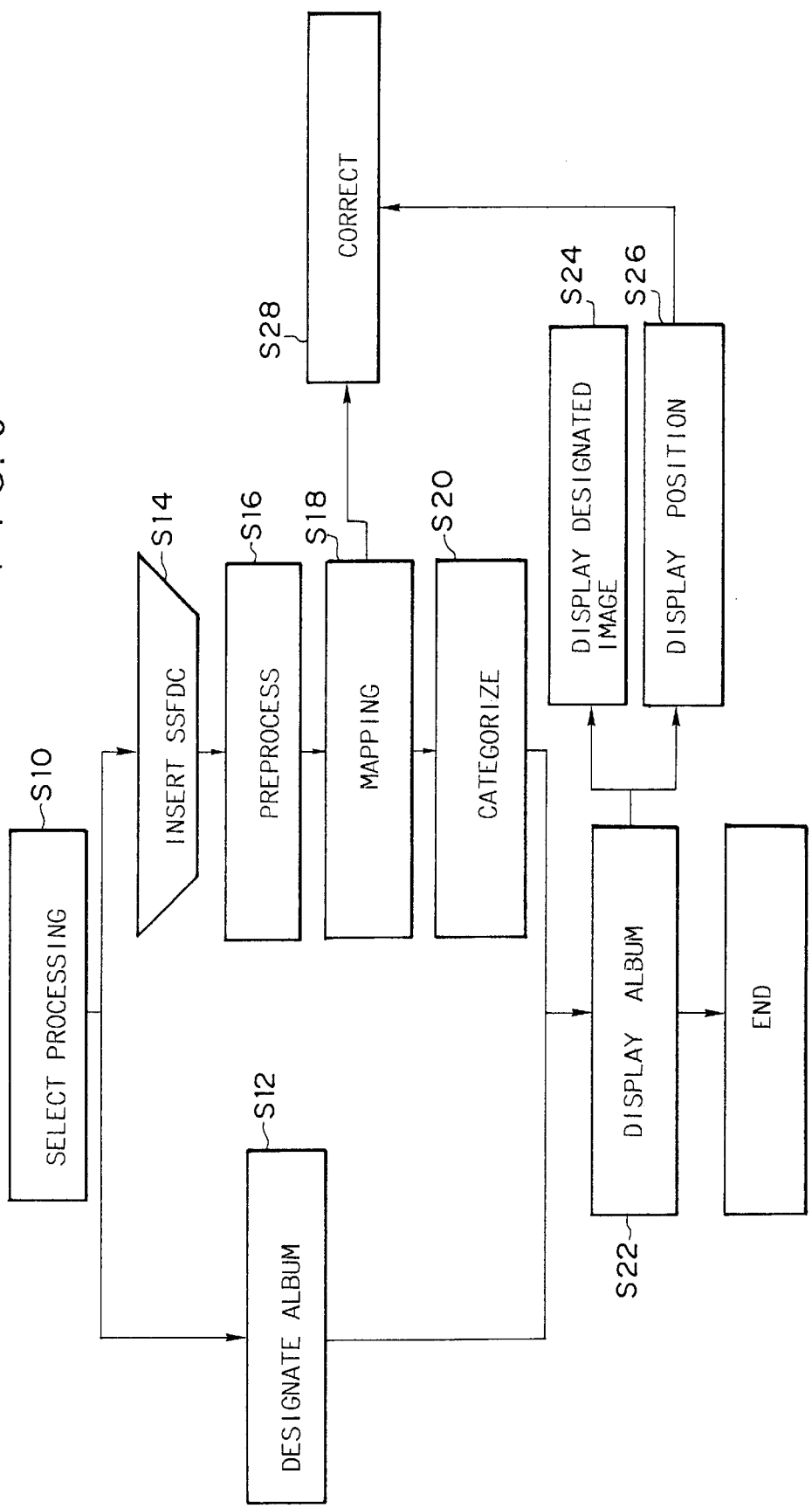
F I G. 5

F I G. 6
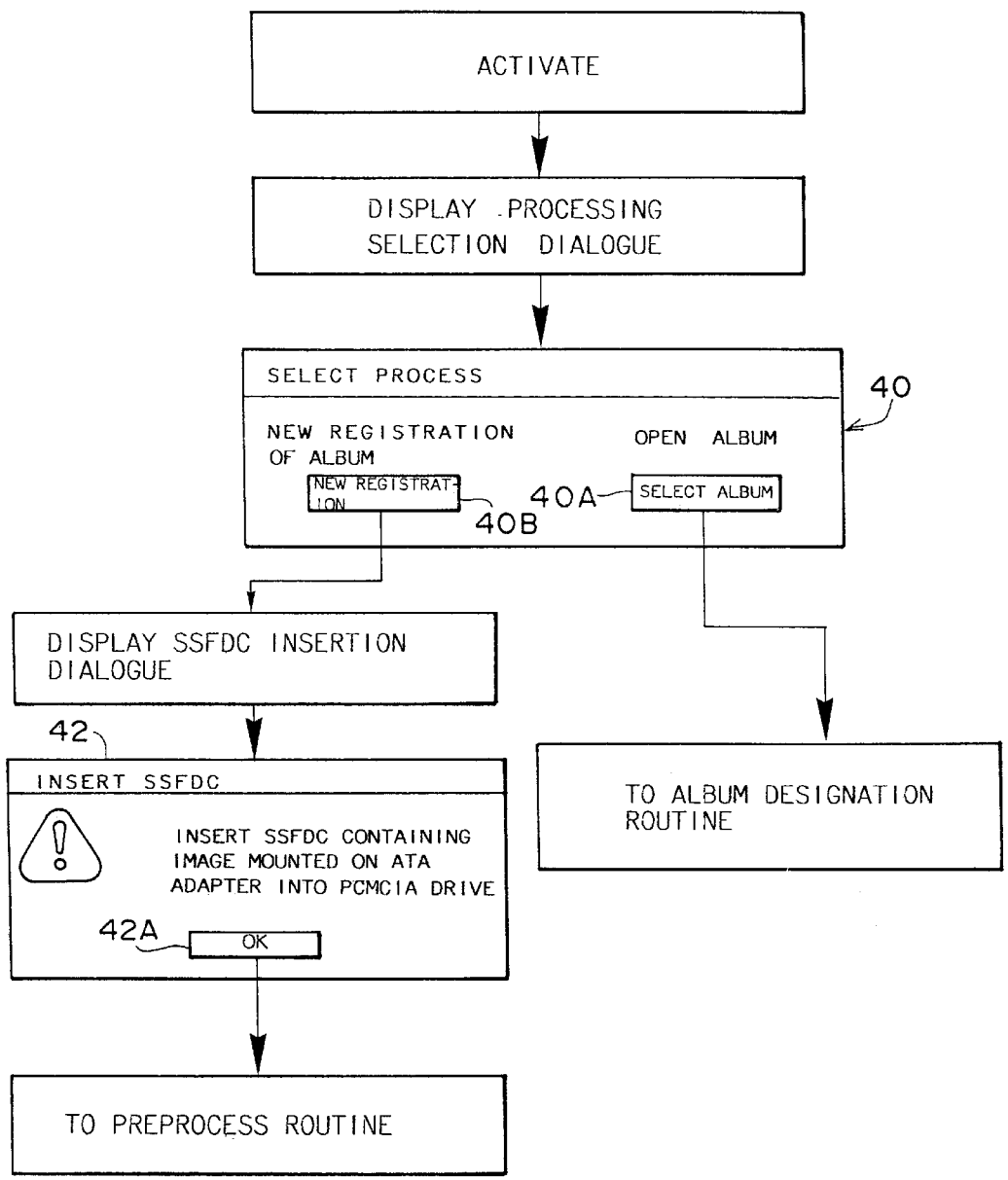

IMAGE REPRODUCING METHOD AND IMAGE DATA MANAGING METHOD

BACKGROUND OF THE INVENTION

1. Field of the Invention

The present invention relates generally to an image reproducing method and image data managing method, and more particularly g an image reproducing method and image data managing method for reproducing and managing images which are captured by a camera connected to a GPS unit, in accordance with GPS information.

2. Description of Related Art

In the GPS (Global Positioning System), it is possible to get the three-dimensional position (latitude, longitude and altitude) of any point on the globe by receiving radio waves from a number of moving satellites. Each satellite has an atomic clock, and it is possible to obtain time information from the satellite by means of the GPS.

There is a conventional system, where a GPS unit is connected to (or built in) a digital camera and where captured images and GPS information such as positional information relating to the captured images are recorded. In this system, when the captured images are reproduced, it is possible to know the global location of each captured image and retrieve a desired captured image according to desired locations.

A conventional image managing unit or image data base is inconvenient to use, because a user must set key words in advance and manually register images in categories of the data base. In particular, the user must register a number of informational items such as the latitude and longitude in order to manage the image data according to the positional information and the time information.

SUMMARY OF THE INVENTION

As stated above, the digital camera connected to the GPS unit records image data and GPS information such as position and time information. Hence, when an image managing unit produces an image file, the image data and the position and time information can be related to one another in an image format. By using the GPS information recorded in the image format, it is possible to efficiently categorize the image data to produce the image file.

An object of the present invention is to provide an image reproducing method and image data managing method for efficiently categorizing captured images, which may be captured by a camera connected to a GPS unit, in accordance with GPS information such as position and time, and for appropriately reproducing and managing the captured images by means of an electronic map.

To achieve the above-mentioned object, an image reproducing method of the present invention comprises the steps of: reading a captured image and GPS information relating to the captured image, recorded by a camera connected to a GPS unit; reading desired map data from a recording medium containing map data, and displaying, on a display, an electronic map including a capturing place of the read captured image; and displaying a thumbnail of the read captured image at an appropriate position on the displayed electronic map in accordance with the read GPS information.

According to the present invention, the location of an image can be easily determined with reference to a thumbnail of the captured image displayed on the electronic map.

To achieve the above-mentioned object, an image data managing method of the present invention comprises the steps of: reading captured images and GPS information relating to the captured images, recorded by a camera connected to a GPS unit; reading desired map data from a recording medium containing map data, and displaying, on a display, an electronic map including capturing places of the read captured images; displaying thumbnails of the read captured images at appropriate positions on the displayed electronic map in accordance with the read GPS information; entering an album name to produce an album; selecting at least one of the read captured images to be registered in the album with reference to the displayed thumbnails; and categorizing the selected captured image by the album name.

According to the present invention, the captured images and the location of each captured image can easily be seen with reference to the thumbnails of the captured images, which are displayed on the electronic map, and an album can easily be produced in accordance with the locations with reference to the displayed image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a flow chart showing the entire processing in the system;

FIG. 6 is a view showing the flow of the processing for selecting a processing and the construction of screens on a monitor;

DETAILED DESCRIPTION OF THE PREFERRED EMBODIMENTS

This invention will be described in further detail by way of example with reference to the accompanying drawings.

Figure 1:
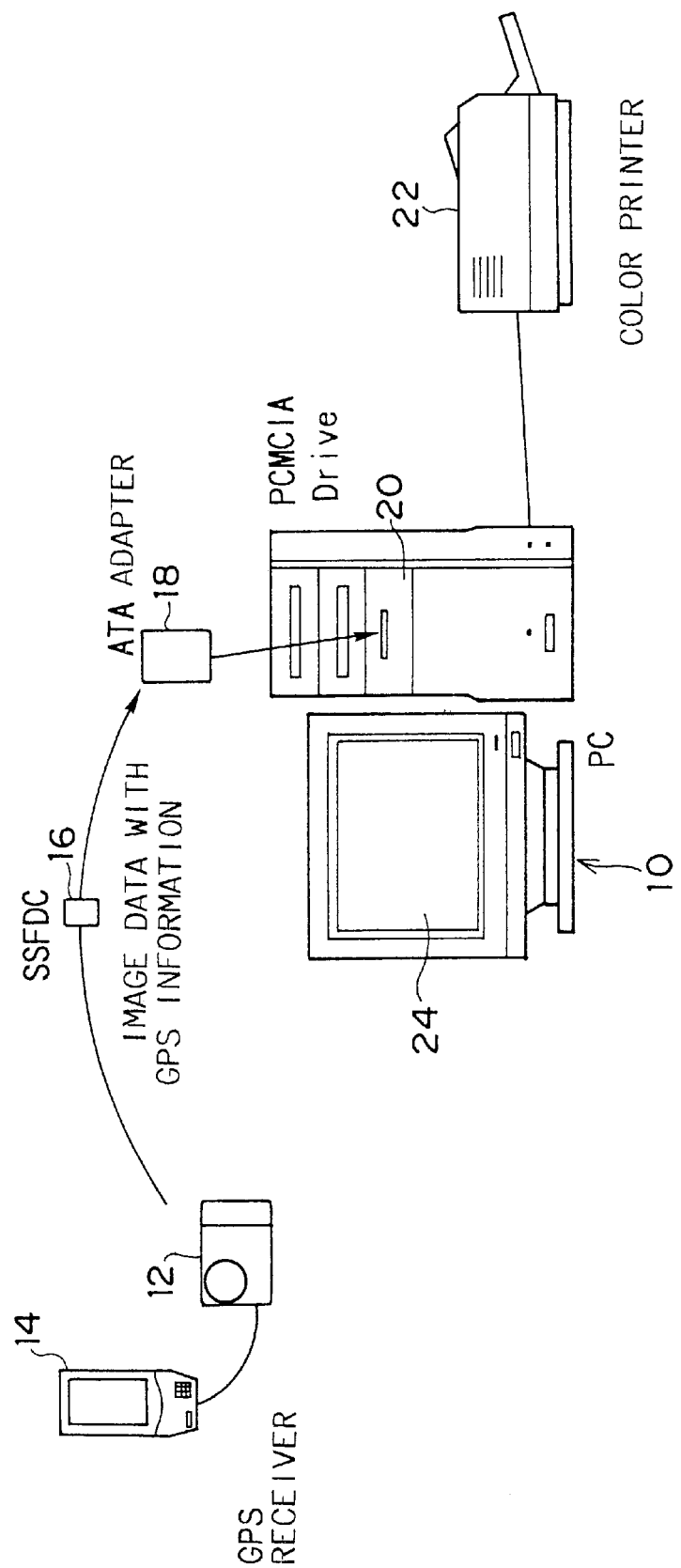
FIG. 1 is a view illustrating the entire construction of an image managing system according to the present invention.

FIG. 1 is a view illustrating an entire construction of an image managing system according to an embodiment of the present invention. As shown in FIG. 1, this system includes a personal computer 10, which is used as an image managing unit, a digital camera 12, a GPS receiver 14, and an SSFDC (Solid State Floppy Disk Card) 16, which is used as a recording medium.

The SSFDC 16, which is a card-like memory, is mounted in the digital camera 12 in FIG. 1, and the captured images are recorded as digital image data in the SSFDC 16. The GPS receiver 14 can be connected to or built into the digital camera 12.

The GPS receiver 14 obtains the present location and time through the GPS. In the GPS, a plurality of satellites orbit the earth and transmit periodical sequential signals and orbital data thereof by radio signals. The GPS receiver 14 receives data from four satellites simultaneously and measures the distances to the satellites. Then, the GPS receiver 14 solves four equations which are set up according to the received data to thereby obtain positional data (latitude, longitude and altitude) of the receiving position as well as the present time.

The digital camera 12 obtains GPS information, which includes the position and time information about the captured image, from the GPS receiver 14. The digital camera 12 records the captured images as well as the GPS information relating to each captured image in the SSFDC 16.

The SSFDC 16 contains a plurality of captured images, captured by the digital camera 12, and the position and time information about each captured image. The SSFDC 16 can be removed from the digital camera 12 and mounted in an ATA (AT attachment) adapter 18 to be inserted into a PCMCIA (Personal Computer Memory Card International Association) drive 20 (hereinafter referred to as a drive 20) of the personal computer 10. Thereby, the data recorded in the SSFDC 16 can be transferred to the personal computer 10.

The personal computer 10 reads the captured images and the GPS information from the SSFDC 16 and stores the data into a built-in memory (e.g. a hard disk). As described later in detail, when the data read form the SSFDC 16 is stored in the built-in memory, an electronic map (a digital map) is displayed on a monitor 24 and the capturing place, time, etc. of each image is shown on the digital map in accordance with the position and time information of the image. A user classifies the images into desired categories with reference to the screen on the monitor 24, thereby freely producing albums. The images and the GPS information attached to the images in each produced album are stored in a directory, and they are managed as a group of data. For example, if an instruction is given to reproduce a desired album, the images registered in the album are automatically read from the memory, and a list of these images are displayed on the monitor 24. The captured images may be printed on a color printer 22.

Figure 2:
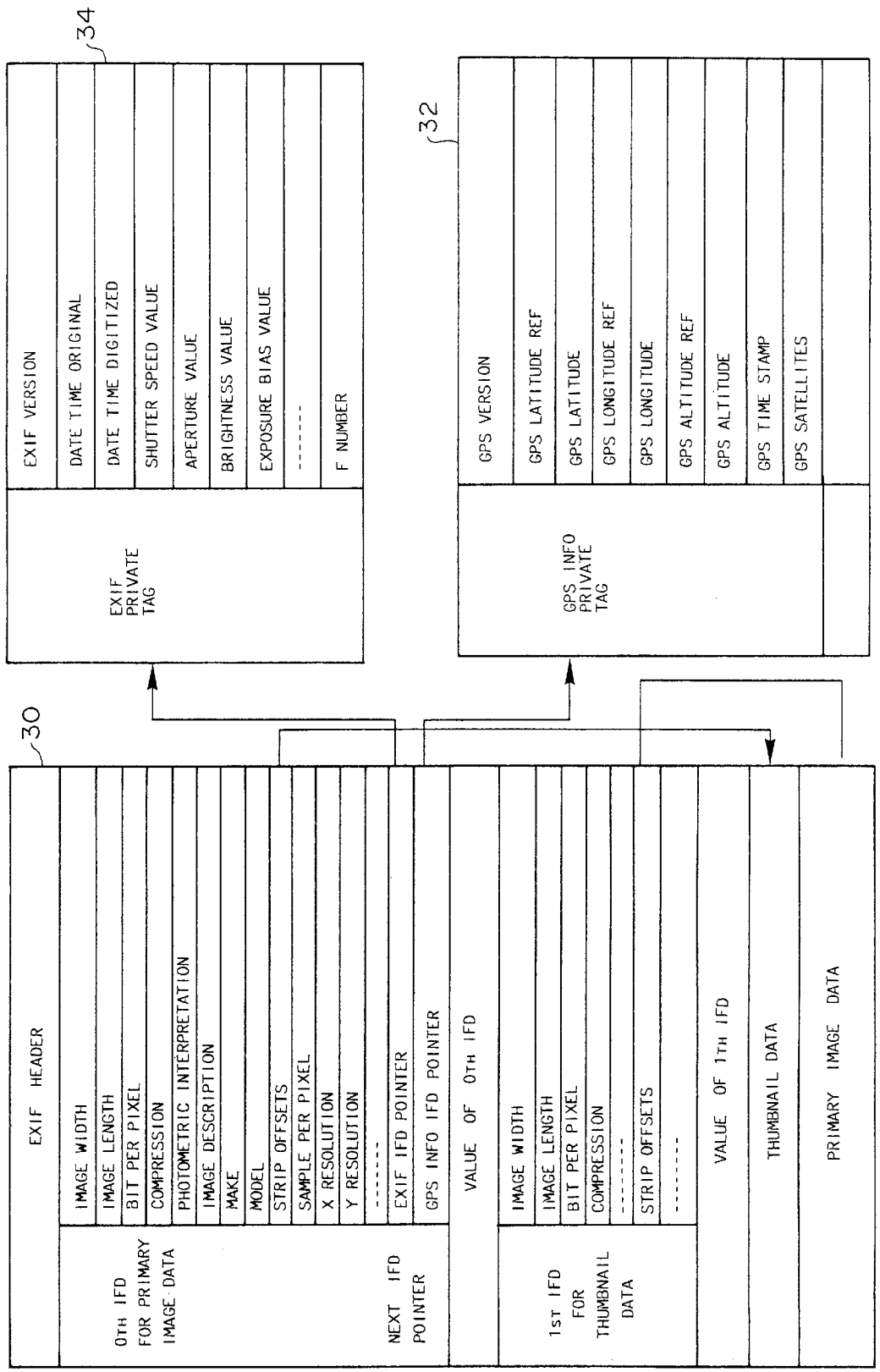
FIG. 2 is a view showing an image format (Exif)

A detailed description will be given of the processing in the abovestated system. FIG. 2 shows an image format (e.g. in Exif Exchangeable Image File Format) used to record an image and information related to the image including the GPS information. As shown in FIG. 2, the image format 30 has an area, which contains information useful in managing the image data; a pointer indicating an address on the memory of a GPS Info Private tag 32, which includes GPS information; and a pointer indicating an address on the memory of an Exif Private tag 34 which includes the capturing information. Thus, the captured images are correlated with the GPS information in the memory. The managing information of the image includes information about the thumbnails (compressed images) as well as information about the original images. The thumbnails are described later.

Figure 3:
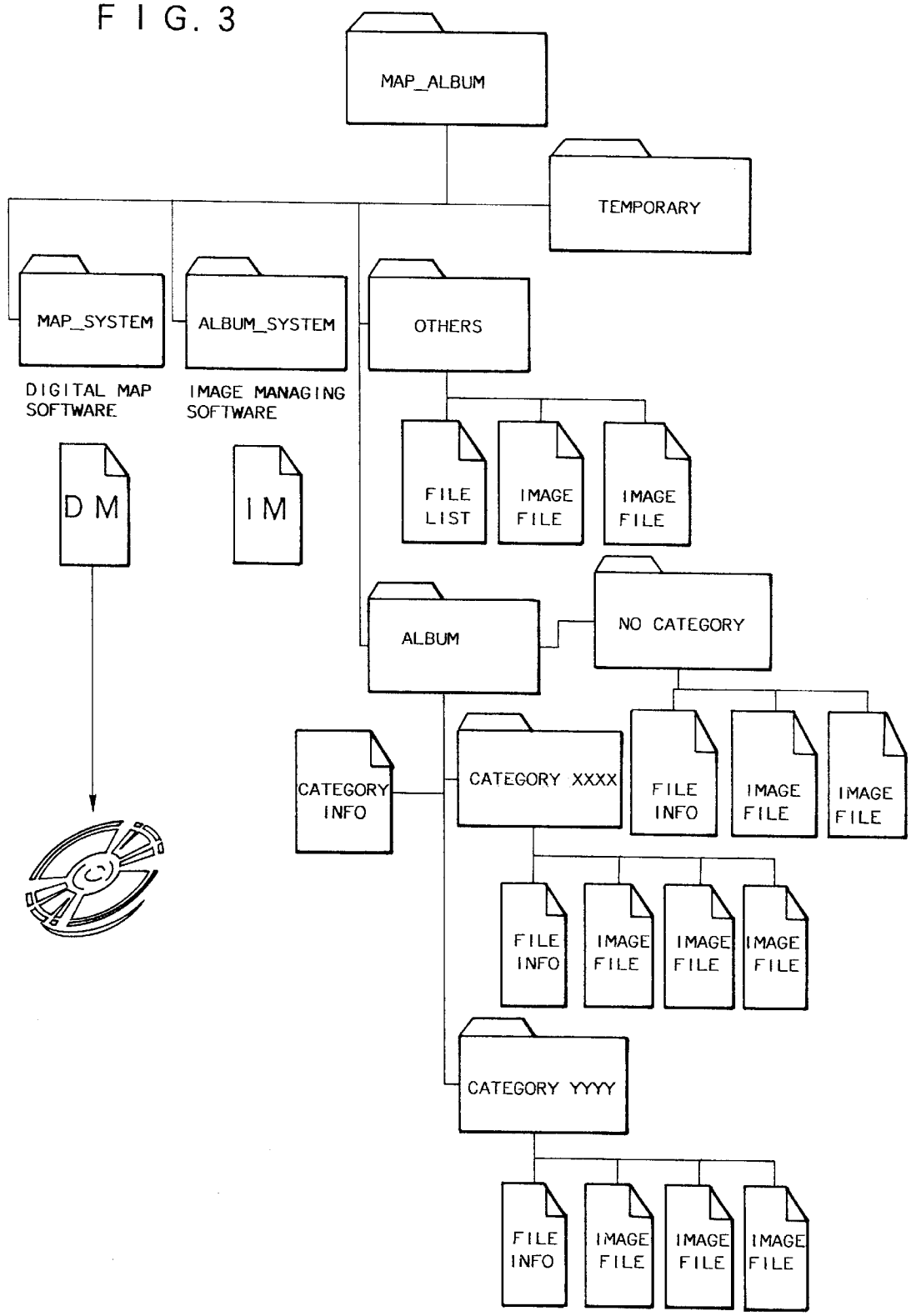
FIG. 3 is a view showing the directory structure in the system.

FIG. 3 shows the directory structure in the system. As shown in FIG. 3, the system is provided hierarchically under a MAP_ALBUM directory. In FIG. 3, DM indicates a digital map software, which is stored under a MAP_SYSTEM directory. DM reads and displays the designated map data stored in a CD-ROM.

DM has interfaces with the outside as described below.

MAP_View (latitude, longitude and scale) displays the map on a designated scale with designated latitude and longitude.

MAP_PicMarker (latitude, longitude, image-capturing time, title, ID, Thumbnail, BOOL) displays a marker and a thumbnail of the image as well the capturing time and title at the designated latitude and longitude. ID sets a unique value.

MAP_HitTest (&latitude, &longitude) returns the latitude and longitude of a position where a pointing device is clicked. If a marker is displayed at that position, ID is returned. Otherwise, a value −1 is returned.

MAP_LineTo (ID1, ID2) draws a line between the positions indicated by ID1 and ID2.

On the other hand, IM indicates an image managing software, and it is stored in the ALBUM_SYSTEM directory. IM manages the album, captures the image data and produces the album of the image data.

An image without the GPS Info tag, or an image without the GPS information is stored in the OTHERS directory. The OTHERS directory contains a file named FILELIST, which includes a list of image files stored in the OTHERS directory and the time when the file was stored in the directory.

The TEMPORARY directory for operation is used mainly for dividing the image data, which are read from the SSFDC 16, into categories.

Under the ALBUM directory, there are directories containing image data which are already categorized into albums.

The ALBUMS directory contains a file named CATEGORYINFO, which includes a list of directories and nicknames given by the user and respectively corresponding to the directories.

The directory of each category e.g., the directory indicated as CATEGORY XXXX in FIG. 3) contains a file named FILELIST. The FILELIST manages the image information in the entire system, and the information is referred in all routines by means of an EntryFile structure.

Figure 4:
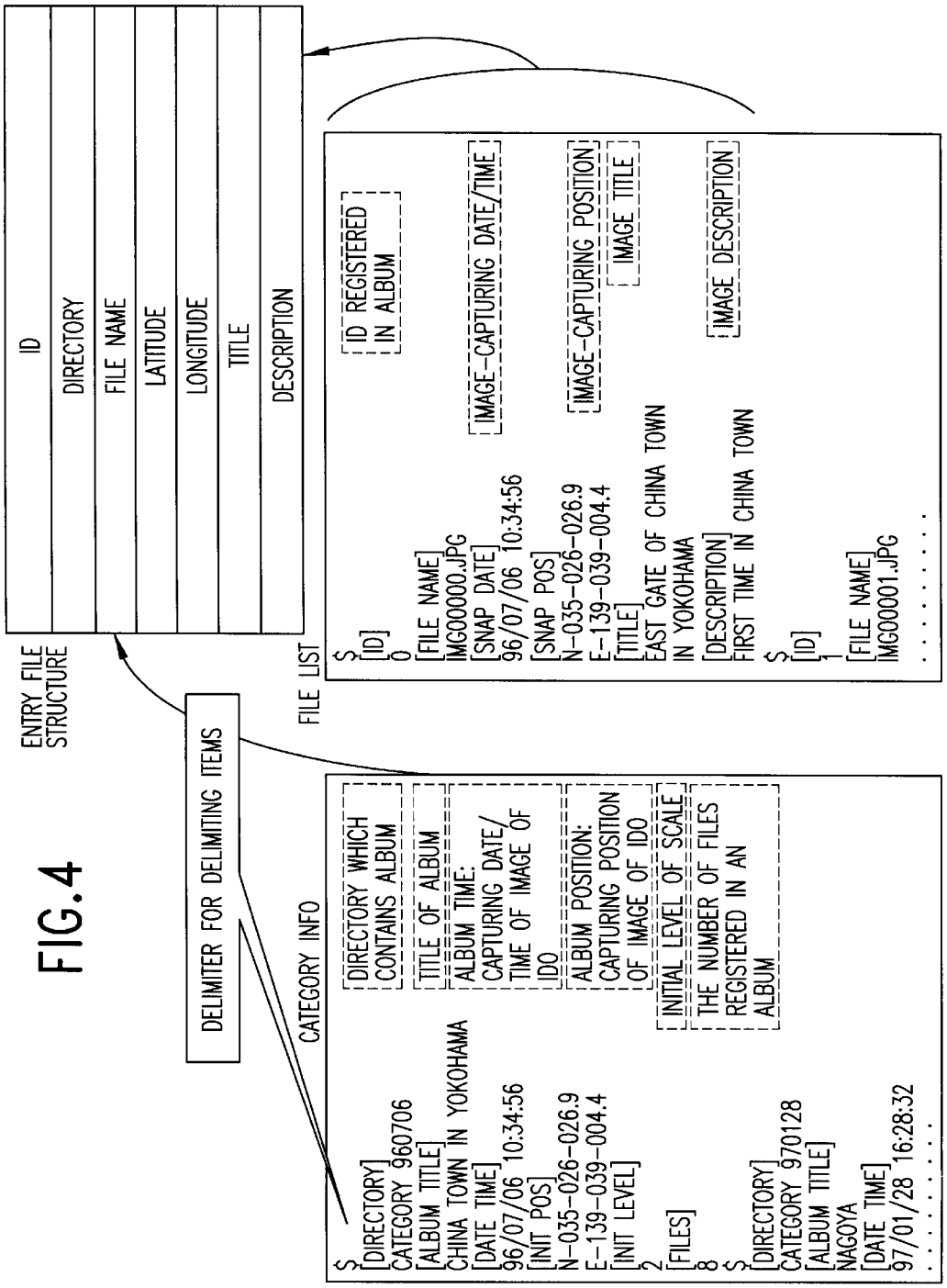
FIG. 4 is a view illustrating the contents of CategoryInfo and FileList and the structure of an EntryFile structure.

FIG. 4 shows the contents of the CATEGORYINFO and FILELIST, and the structure of the ENTRYFILE structure.

FIG. 5 is a flow chart showing the entire processing in the system. A detailed description of the details of the processing in the system will be given with reference to the flow chart.

First, a processing option is selected (S10). FIG. 6 is a view illustrating the flow showing the details of the processing routine S10, and the construction of related displays on the monitor 24.

As shown in FIG. 6, when the system is activated, a processing selection screen 40 is displayed on the monitor 24 to select new registration of an album or reading of an album (opening an album). If the "SELECT ALBUM"

button 40A is clicked on the processing selection screen 40 with a mouse, the album is opened. If a "NEW REGISTRATION" button 40B is clicked, the new registration process to register the album is started.

Figure 7:
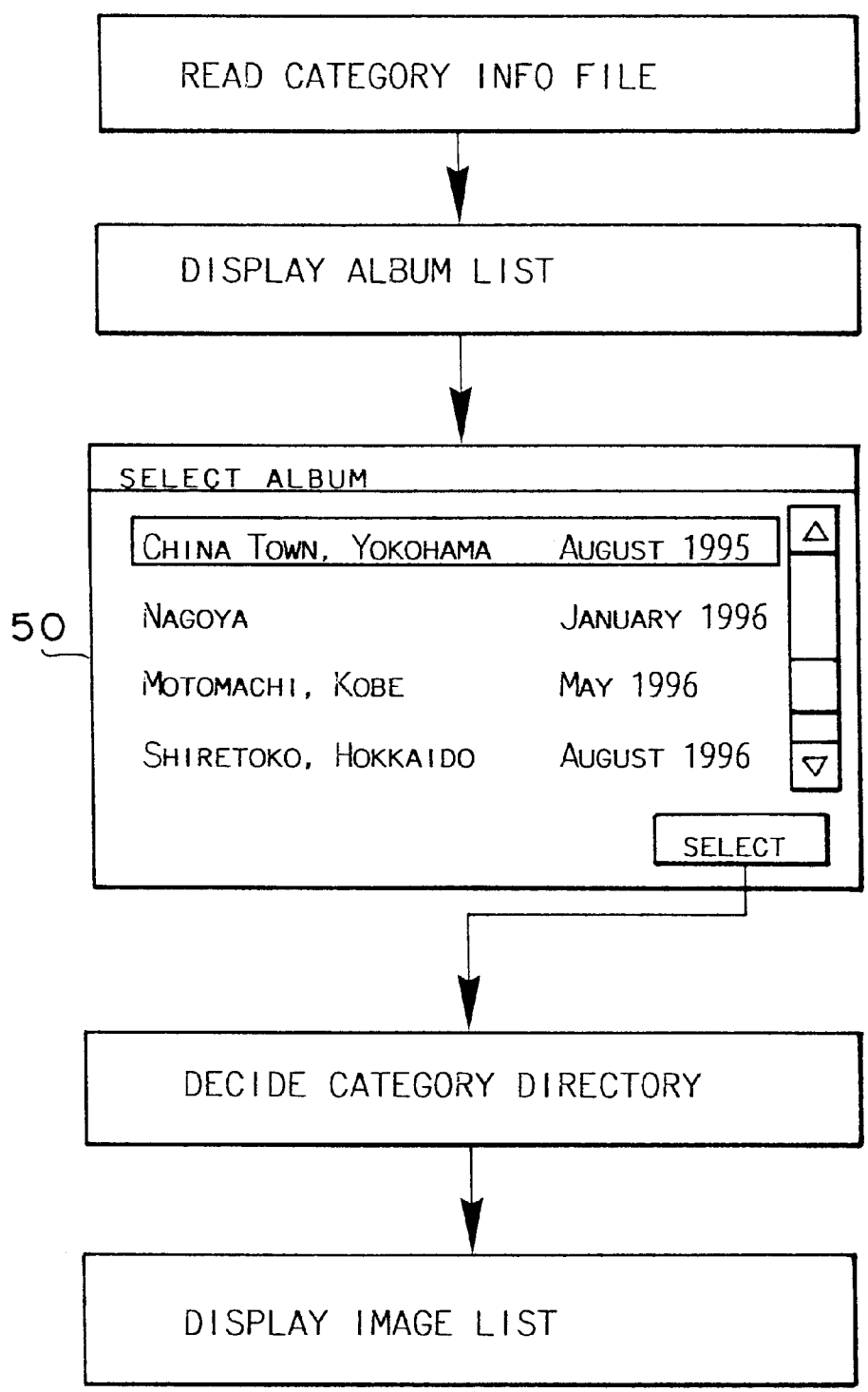
FIG. 7 is a view showing the flow of the processing for designating an album and the construction of a screen on the monitor.

A description will be given of the case where the "SELECT ALBUM" button 40A is clicked to open the album. When this button is selected, an album is designated as shown in the flow chart in FIG. 5 (S12). FIG. 7 shows the flow of the album opening routine S12 and the construction of an example display on the monitor 24.

As shown in FIG. 7, the CATEGORYINFO file is read, and a list of albums are displayed on a list screen 50. The list screen 50 shows a list of titles and registration dates of the albums, which are registered in the memory (hard disk). If a cursor-is moved to the title of a desired album and clicked, the album is selected and a category directory for reading the image file is determined.

Figure 8:
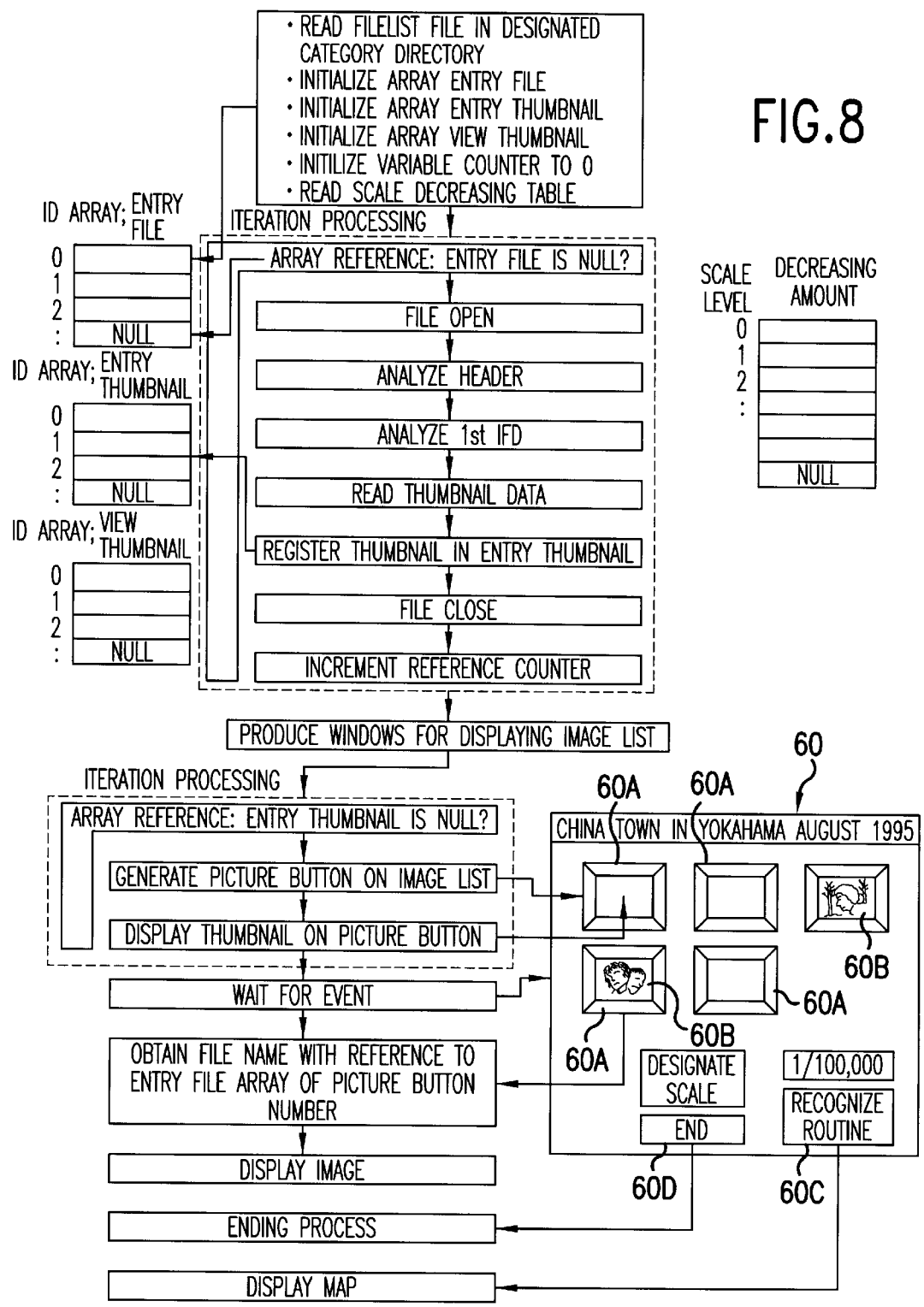
FIG. 8 is a view showing the flow of the processing for displaying an album and the construction of a screen on the monitor.

After the album is designated as stated above (S12), the designated album is displayed on the monitor 24 (S22). FIG. 8 shows the flow of the album display routine S22 and the construction of the corresponding display on the monitor 24. When the album is designated, image files are read from the category directory of the designated album, and a list of images registered in the album are shown on a list display screen 60 of the monitor 24 as shown in FIG. 8. The number of picture buttons 60A displayed correspond to the number of images registered in the album. Thumbnails 60B, which are registered in the albums, are displayed on the picture buttons 60A. Each thumbnail is produced by decreasing the image data of the original image and compressing the image.

If the picture button 60A is clicked on the list display screen 60 to designate a desired image, an original image thereof is displayed on the monitor 24. If a "RECOGNIZE ROUTE" button 60C is clicked, a screen for showing the capturing route is displayed. If an "END" button 64D is clicked, the displaying of the list is ended.

Figure 9:
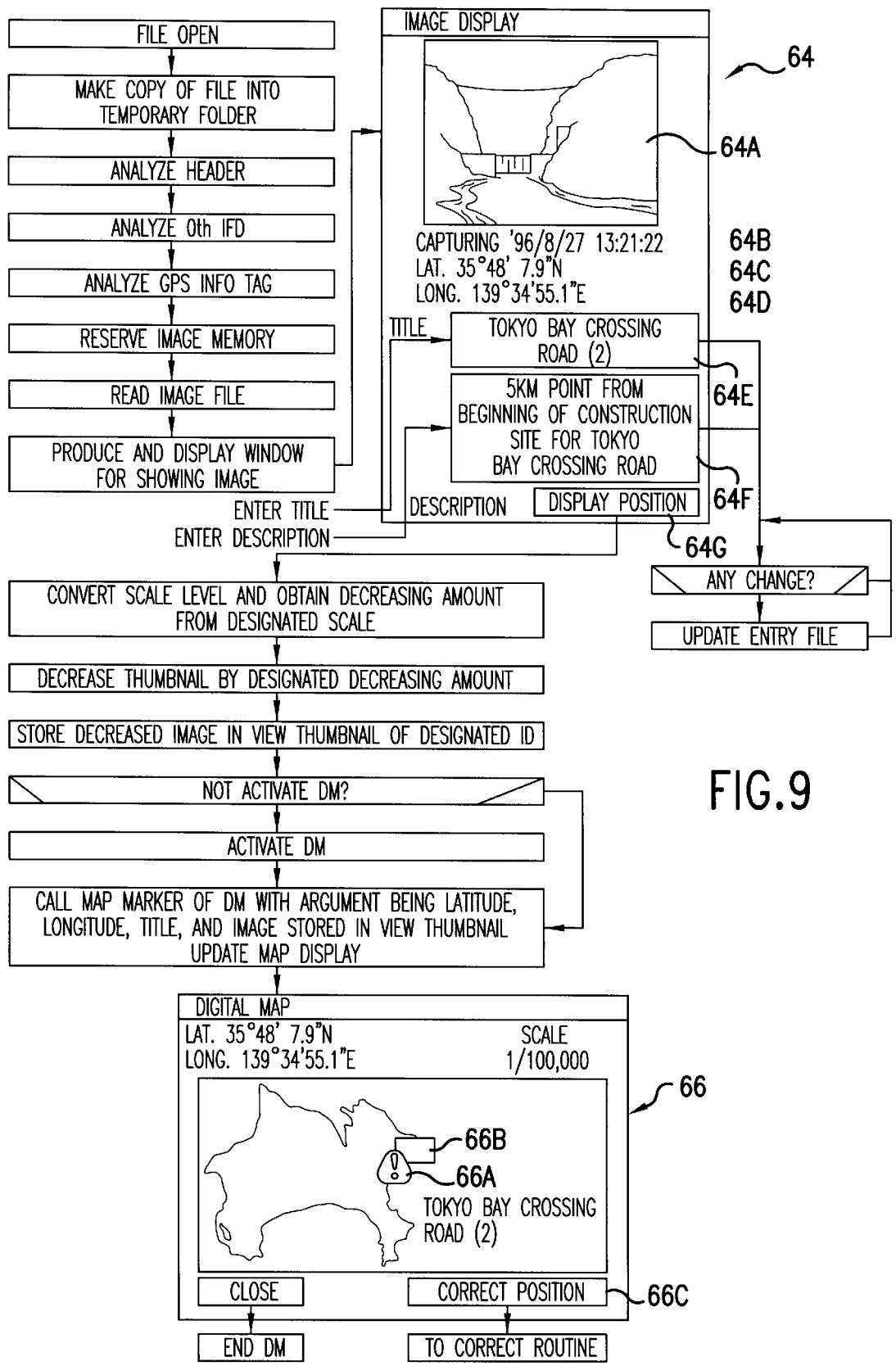
FIG. 9 is a view showing the flow of the processing for displaying a designated image and the construction of screens on the monitor.

If a desired picture button 60A is clicked to designate a desired image, the original image thereof is displayed on the monitor as shown in the flow chart of FIG. 5 (S24). FIG. 9 shows the flow of the display designated image routine S24 and the construction of an example related display on the monitor 24. As shown in FIG. 9, when a desired image is designated, the image file of the designated image is opened. The original image and information related to the image, including the GPS information, are read from the image file. Then, an image display screen 64 is displayed on the monitor 24 as shown in FIG. 9. The image display screen 64 shows the designated image 64A, the capturing time 64B of the image, latitude 64C, longitude 64D, a title 64E and a description 64F. The title 64E and the description 64F may be updated on the image display screen 64.

If a "DISPLAY POSITION" button 64G is clicked, the capturing place is displayed as shown in the flow chart of FIG. 5 (S26). In this case, DM is activated, and the digital map including the capturing place of the image is displayed as a digital map screen 66 in accordance with the positional information as shown in FIG. 9. A marker 66A indicating the capturing place of the designated image and a thumbnail 66B of the image are displayed at the capturing place on the digital map screen 66.

Figure 14:
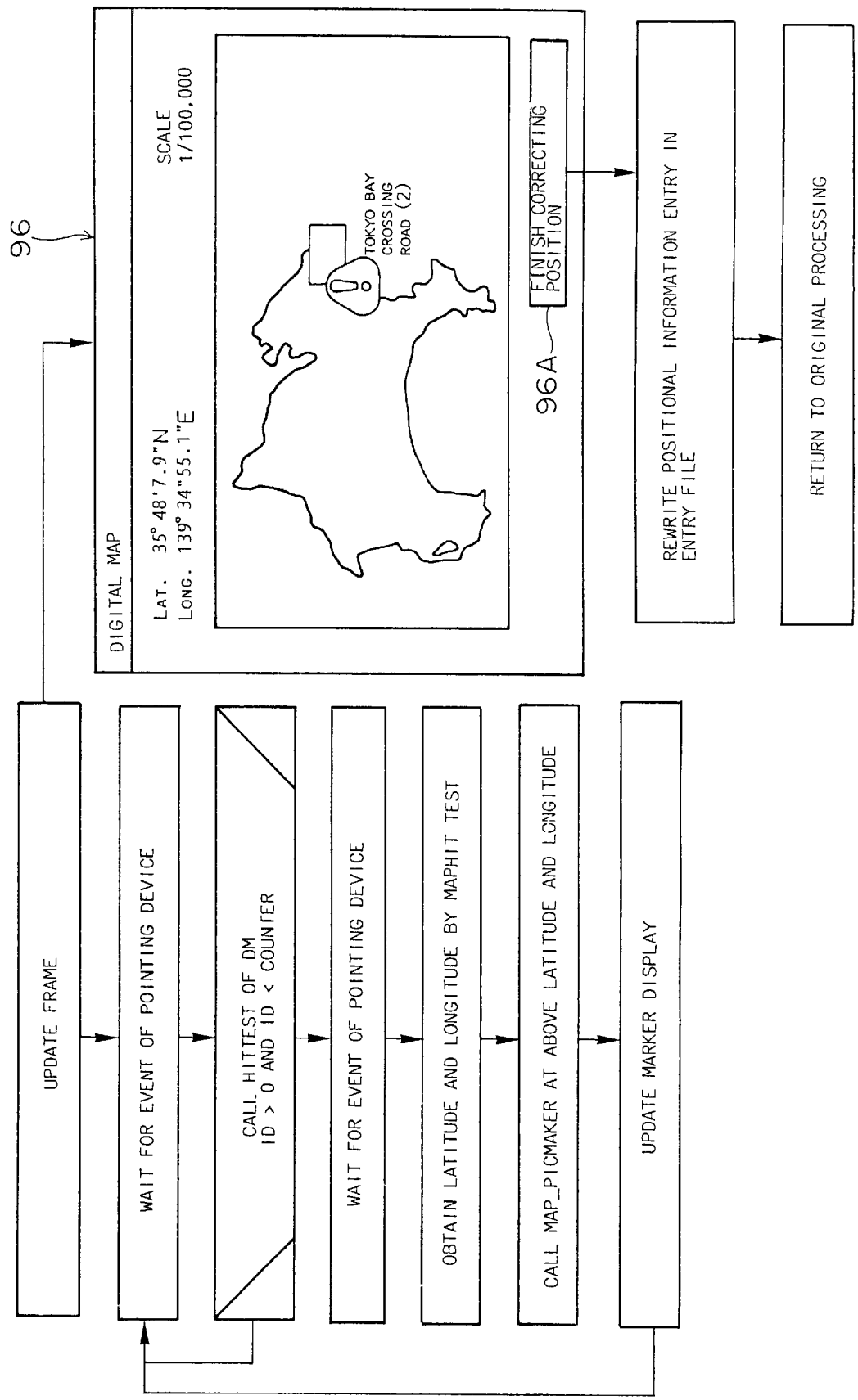
FIG. 14 is a view showing the flow of the processing for correcting a position and the construction of a screen on the monitor.

If a "CORRECT POSITION" button 66C is clicked, the capturing place is corrected as shown in the flow chart of FIG. 5 (S28). FIG. 14 shows the flow of the correct position routine S28 and the construction of related display on the monitor 24. As shown in FIG. 14, a digital map screen 96 is displayed on the monitor 24 so that the position may be corrected. If a desired position on the digital map is clicked with the mouse while the digital map screen 96 is displayed, the capturing place of the image displayed on the digital map screen 96 is corrected to the clicked position. If a "FINISH CORRECTING POSITION" button 96A is clicked after the correction, the original screen is displayed.

Figure 10:
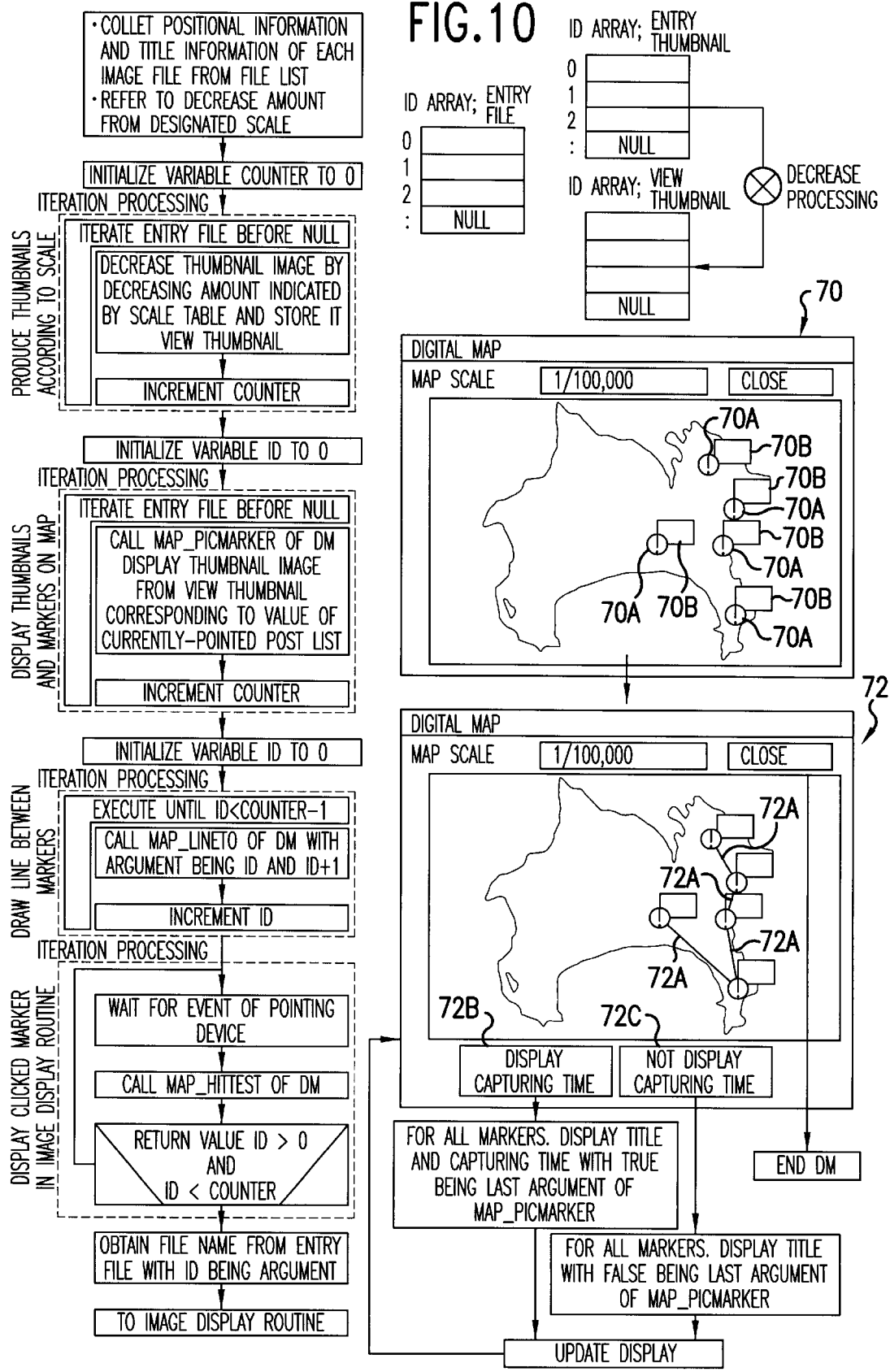
FIG. 10 is a view showing the flow of the processing for showing a capturing route and the construction of a screen on the monitor.

On the other hand, if the "RECOGNIZE ROUTE" button 60C is clicked while the list display screen 60 is displayed as shown in FIG. 8 (S22), a digital map screen 70 is displayed as shown in FIG. 10 (in fact, a digital map screen 72 of FIG. 10 is displayed). A digital map including the locations of the images is displayed on, the digital map screen 70. Markers 70A, which indicate the locations of the captured images, and thumbnails 70B of the images are displayed on the digital map corresponding to the locations. As shown in FIG. 10, lines 72A are drawn between the markers 70A in capturing order to show the capturing route.

If a "DISPLAY CAPTURING TIME" button 72B is clicked on the digital map screen 72, the capturing time is displayed at each capturing place on the digital map. If a "NOT DISPLAY CAPTURING TIME" button 72C is clicked, the capturing time is not displayed.

Above processing is performed in the case where the opening of the album is selected (S10 in the flow chart of FIG. 5, also see FIG. 6).

As stated above, when the captured images registered in the album are reproduced, the digital map is displayed to show the thumbnail and the capturing place and time of each captured image in accordance with the GPS information, and thus, the capturing place and time of each captured image are easily recalled.

Figure 11:
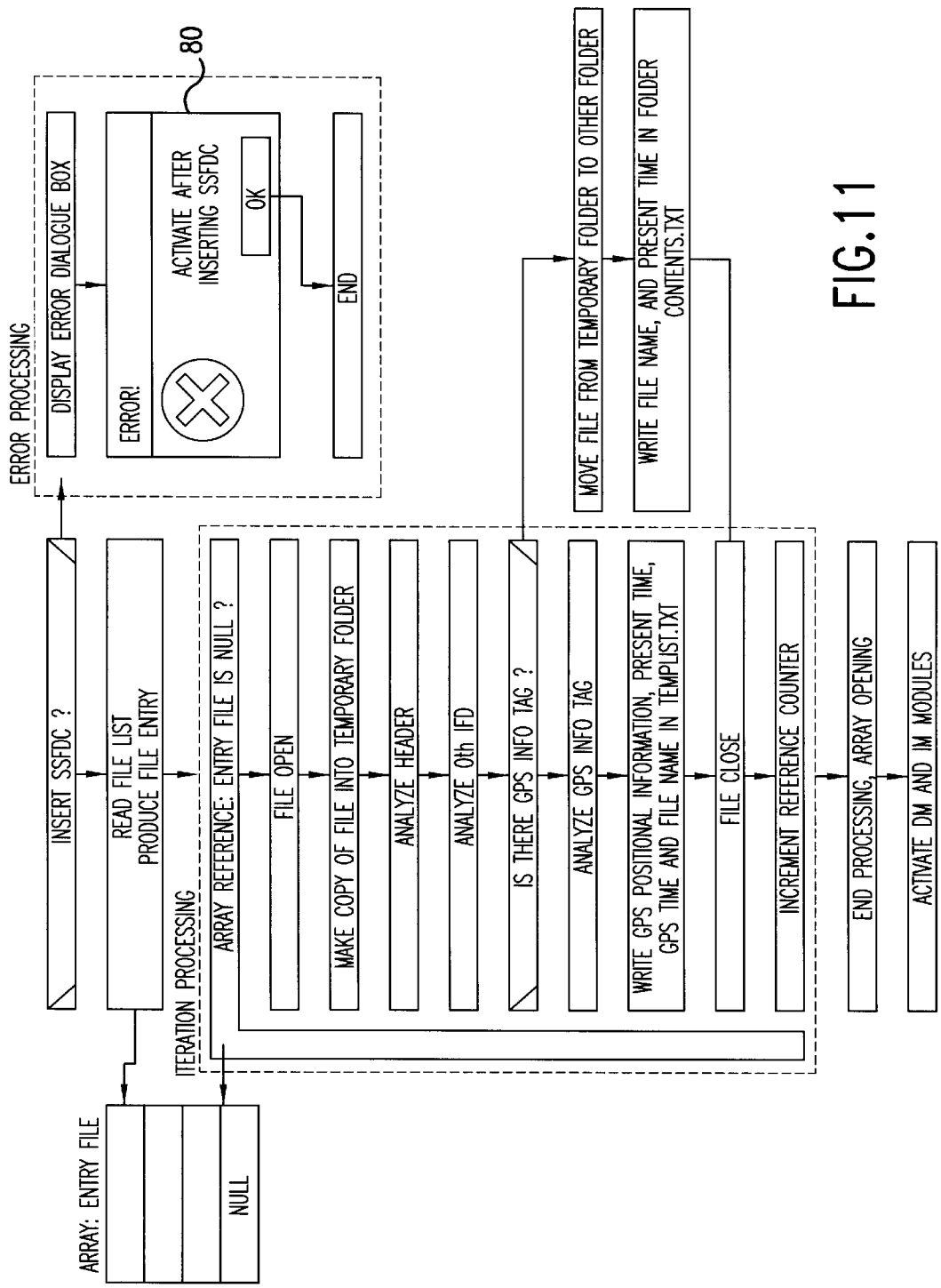
FIG. 11 is a view showing the flow of the preprocessing and the construction of a screen on the monitor.

A description will be given of the case where the processing of newly registering an album is selected (step S10 in the flow chart of FIG. 5). In other words, the "NEW REGISTRATION" button 40B is chosen on the processing selection screen 40 in FIG. 6. When this occurs, an SSFDC insertion dialog display screen 42 is displayed as shown in FIG. 6. If an "OK" button 42A is clicked on the dialog display screen 42, PreProcess routine is executed as shown in the flow chart of FIG. 5 (S16). FIG. 11 shows the flow of the (Preprocess routine S16 and the construction of a corresponding display on the monitor 24. As shown in FIG. 11, if the SSFDC 16 is not inserted in the drive 20, an error screen is dispalyed on the monitor 24.

On the other hand, if the SSFDC 16 is inserted in the drive 20, the captured images and the GPS information are read into the personal computer 10 from the SSFDC 16. Then DM and IM are activated.

Figure 12:
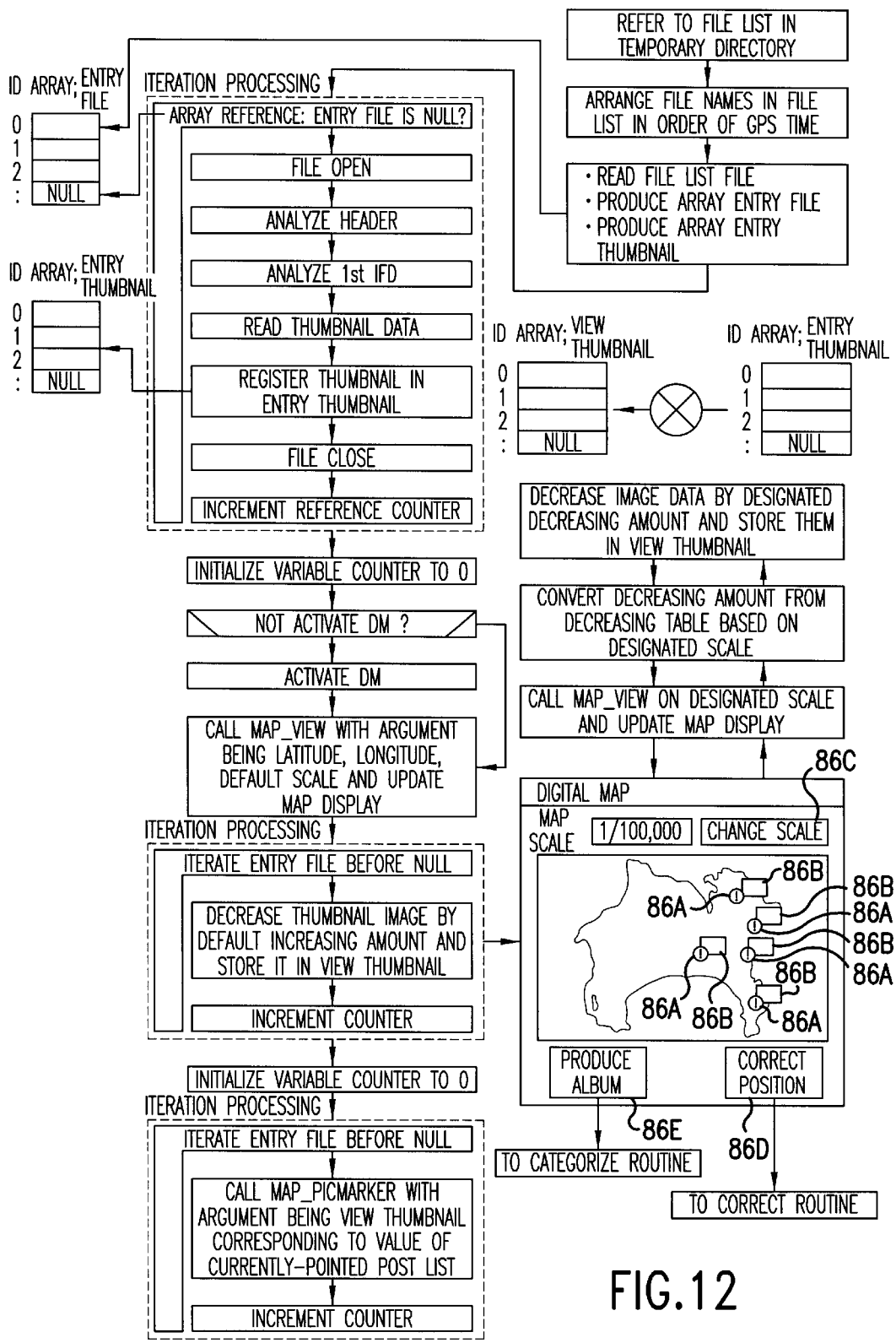
FIG. 12 is a view showing the flow of the processing for mapping and the construction of a screen on the monitor.

Then, the mapping process is executed as shown in the flow chart of FIG. 5 (S18). FIG. 12 shows the flow of the mapping process routine S18 and the construction of a related display on the monitor 24. As shown in FIG. 12, a mapping screen 86 is displayed on the monitor 24. A digital map, which is produced by DM, is displayed on the mapping screen 86. Markers 86A, which indicate the locations of the captured images, and thumbnails 86B are displayed on the digital map 86 according to the positional information read from the SSFDC 16. If a "CHANGE SCALE" button 86C is chosen on the mapping screen 86, the scale of the digital map on the screen can be changed. If the "CORRECT POSITION" button 86D is chosen, the capturing location can be changed. If a "PRODUCE ALBUM" button 86E is clicked, an album production is initiated. The thumbnails 86B are resized in accordance with the scale of the digital map.

Figure 13:
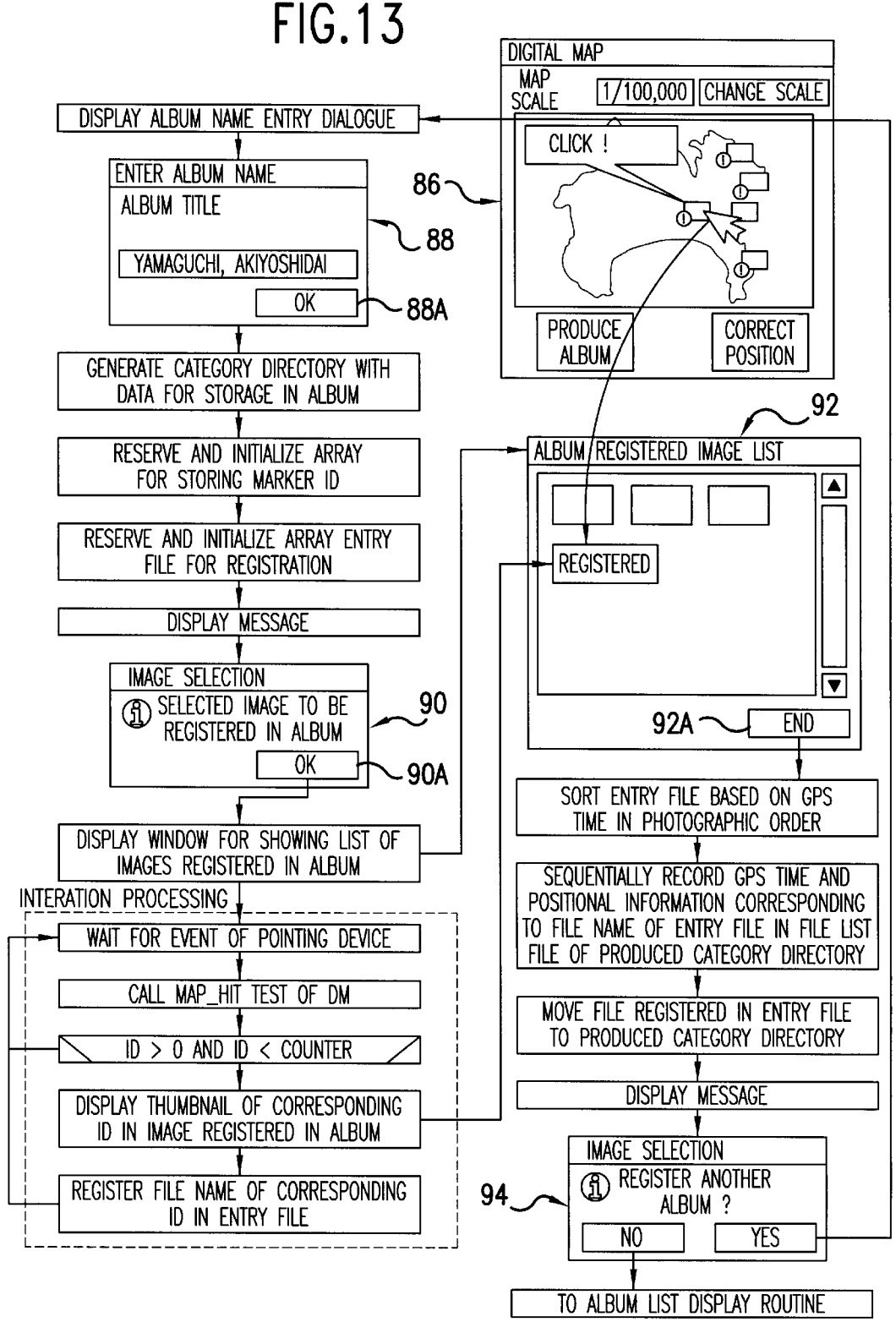
FIG. 13 is a view showing the flow of the processing for categorization and the construction of screens on the monitor.

When the "PRODUCE ALBUM" button 86E is chosen, a categorization routine is executed as shown in the flow chart of FIG. 5 (S20). FIG. 13 shows the flow of the categorization routine S20 and the construction of a related display on the monitor 24. First, an album name entry screen 88 is displayed as shown in FIG. 13. If an album name is entered and an "OK" button 88A is clicked on the entry screen 88, a message screen 90 is displayed to suggest the selection of images to be registered in the album as shown in FIG. 13.

If an "OK" button 90A is clicked on the message screen 90, an album registration image. list screen 92 is displayed as shown in FIG. 13. If an image to be registered in the album is selected, the thumbnail 86B of the image clicked on the mapping screen 86. Thereby, the thumbnail of the selected image is displayed on the album registration image list screen 92.

After selecting the images to be registered in the album, an "END" button 92A is clicked. Thus, the images displayed on the album registration image list screen 92 and the GPS information attached to the images are stored in one album and are recorded in one category directory.

After the "END" button 92A is pressed to register the albums, a selection screen 94 is displayed as shown in FIG. 13. On the selection screen 94, it is determined whether another album will be registered or not. If another album will not be registered, a list of images registered in the album are displayed as shown in the flow chart of FIG. 5 (S22), and a list of images in the registered album is displayed in the same manner as the list display screen 60 in FIG. 8.

Figure 15:
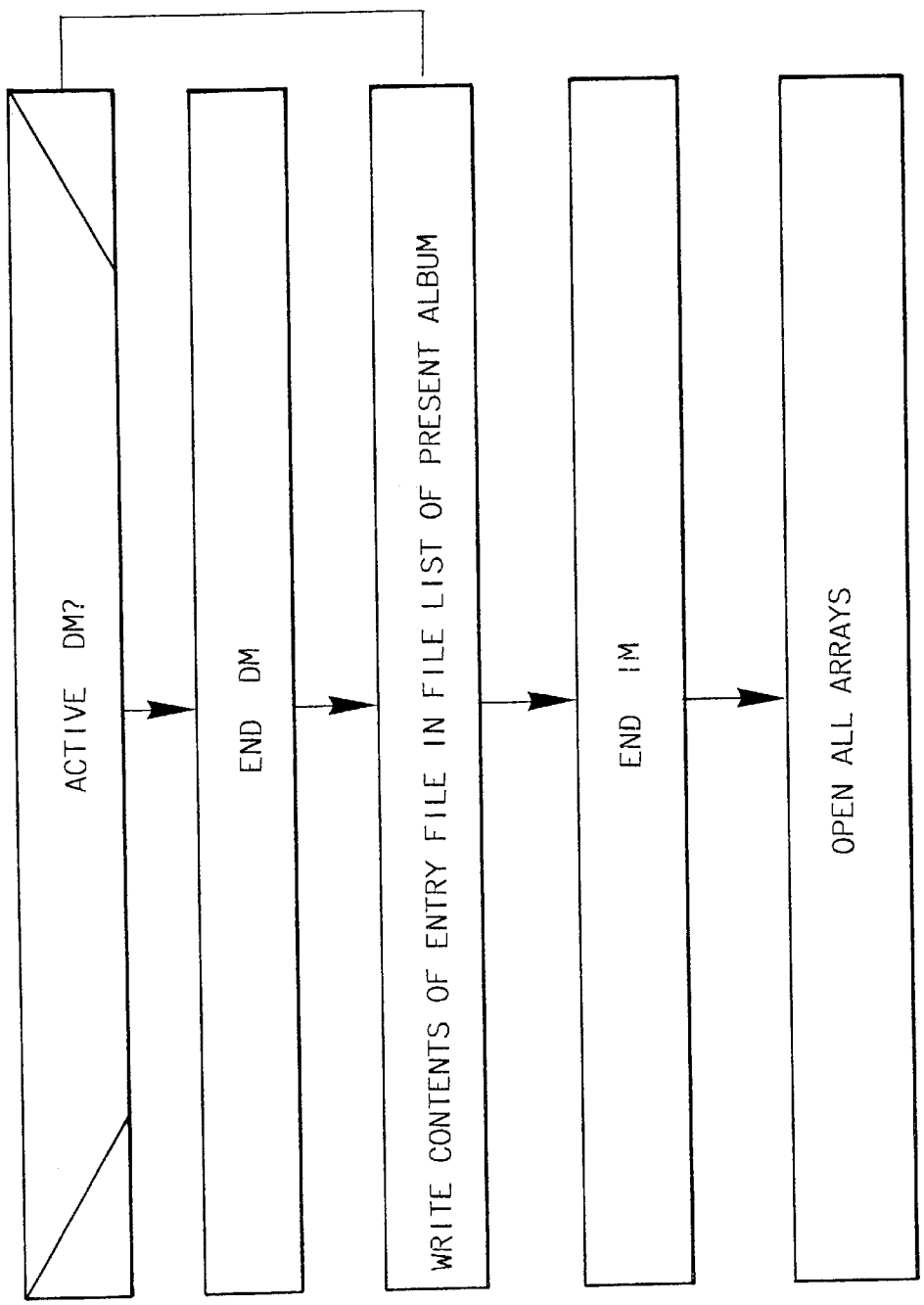
FIG. 15 is a flow chart of the end processing.

If the "END" button 60D is clicked on the list display screen 60 in FIG. 8, the end processing routine is executed as shown in FIG. 15 to thereby stop the processing in the system.

Thus, the captured images, and the GPS information of each image in the SSFDC 16 are categorized into the albums and are recorded in the memory (e.g. the hard disk) in the personal computer 10. The album can be produced with reference to the thumbnail and the location of each captured image, which are displayed on the digital map in accordance with the GPS information. Thereby, a desired album can easily be produced by categorizing the captured images.

The image data representing the thumbnail can be increased and decreased, so that the thumbnail can be expanded and compressed according to the size of the display screen or the scale of the digital map.

In this embodiment, the images captured by the digital camera which can be connect to the GPS unit are managed. However, the present invention may also be applied to the case where images are managed which are photographed by a camera which uses advanced photographic film coated with a magnetic recording layer, on which a variety of information can be recorded, and which camera is able to connect to the GPS unit and record the GPS information on the magnetic recording layer.

As set forth hereinabove, according to the present invention, it is possible to easily recognize the captured images, and the location of each captured image with reference to the respective, thumbnail which are displayed on the digital map. Moreover, desired albums can easily be produced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image reproducing method comprising the steps of:

reading a captured image and GPS information relating to the captured image, recorded by a camera connected to a GPS unit;

reading desired map data from a recording medium containing map data, and displaying, on a display, an electronic map including a capturing place of the read captured image; and displaying a thumbnail of said read captured image at an appropriate position on the displayed electronic map in accordance with the read GPS information.

2. The image reproducing method as defined in claim 1, further comprising the steps of:

displaying markers, indicating the capturing places of the read captured images, on said electronic map in accordance with positional information in said read GPS information; and drawing a line between the displayed markers in image-capturing order in accordance with time information in said read GPS information to show an image-capturing route.

3. The image reproducing method as defined in claim 1, wherein said electronic map is displayed on a designated scale with designated latitude and longitude.

4. The image reproducing method as defined in claim 1, wherein said thumbnail displayed on said electronic map is expanded or compressed according to a scale of said electronic map.

5. The image reproducing method as defined in claim 1, wherein positional information in said GPS information is corrected to a desired position by a pointing device on said electronic map displayed on said display.

6. An image data managing method comprising the steps of:

reading captured images and GPS information relating to the captured images, recorded by a camera connected to a GPS unit;

reading desired map data from a recording medium containing map data, and displaying, on a display, an electronic map including capturing places of the read captured images;

displaying thumbnails of said read captured images at appropriate positions on the displayed electronic map in accordance with the read GPS information;

entering an album name to produce an album;

selecting at least one of said read captured images to be registered in the album with reference to the displayed thumbnails; and categorizing the selected captured image by said album name.

7. An image reproducing method comprising the steps of:

reading captured images and GPS information relating to the captured images, recorded by a camera connected to a GPS unit;

reading desired map data from a recording medium containing map data, and displaying, on a display, an electronic map including capturing places of the read captured images;

displaying thumbnails of said read captured images at appropriate positions on the displayed electronic map in accordance with the read GPS information;

entering an album name to produce an album;

selecting at least one of said read captured images to be registered in the album with reference to the displayed thumbnails;

categorizing the selected captured image by said album name;

displaying a list of the album names of the produced albums, and selecting a desired album from the list;

displaying a list of the thumbnails of the captured images categorized in the selected album, and selecting a desired captured image with reference to the displayed list of thumbnails; and displaying the selected captured image on said display.

8. An image managing method, comprising:

retrieving a plurality of images including captured location and time information related to each of said plurality of images;

retrieving a map data containing said captured locations of said plurality of images and displaying an electronic map;

displaying thumbnails of said plurality of images corresponding to said captured locations of said images on said electronic map; and organizing a subset of said plurality of images into an album.

9. The method of claim 8, wherein said plurality of images are recorded via a camera.

10. The method of claim 9, wherein said captured location and time information is recorded via a global positioning unit (GPU) connected to said camera.

11. The method of claim 8, further comprising:

adjusting said display of said electronic map to a scale according to said captured locations of said plurality of images and/or user input.

12. The method of claim 11, further comprising:

adjusting said display of thumbnails according to said scale of said electronic map display.

13. The method of claim 8, further comprising:

correcting said captured location information of an image according to user input.

14. The method of claim 13, wherein said user input includes selecting a location on said display of said electronic map via a pointing device.

15. The method of claim 8, further comprising:

displaying markers of said plurality of images corresponding to said captured locations of said images on said electronic map; and marking an image-route corresponding to a time-order of said plurality of images.

16. The method of claim 8, wherein said organizing step comprises:

opening said album;

registering said subset of said plurality of images into said album.

17. The method of claim 16, wherein said album opening step comprises:

displaying a list of albums;

selecting said album according to user input;

displaying a list of thumbnails of images related to said album.

18. The method of claim 8, further comprising:

selecting one of said thumbnails according to user input;

displaying a full image when said thumbnail is selected.

* * * * *